United States Patent
Ascoli et al.

(10) Patent No.: US 7,966,413 B2
(45) Date of Patent: Jun. 21, 2011

(54) METHOD FOR CONFIGURING A PROGRAMMABLE LOGIC CONTROLLER USING A SCHEMA TO VALIDATE EXTENSIBLE MARKUP LANGUAGE FILE

(75) Inventors: Judy Dixon Ascoli, Ruckersville, VA (US); Paul Joseph O'Dea, Muskego, WI (US)

(73) Assignee: GE Fanuc Automation North America, Inc., Charlottesville, VA (US)

(*) Notice: Subject to any disclaimer, the term of this patent is extended or adjusted under 35 U.S.C. 154(b) by 1041 days.

(21) Appl. No.: 11/762,931

(22) Filed: Jun. 14, 2007

(65) Prior Publication Data

US 2008/0016235 A1    Jan. 17, 2008

Related U.S. Application Data

(63) Continuation of application No. 10/065,623, filed on Nov. 4, 2002, now Pat. No. 7,240,119.

(51) Int. Cl.
*G06F 15/16* (2006.01)
(52) U.S. Cl. ....................................................... 709/230
(58) Field of Classification Search .................. 709/218, 709/230; 715/234, 239
See application file for complete search history.

(56) References Cited

U.S. PATENT DOCUMENTS

| | | | |
|---|---|---|---|
| 4,926,375 A | 5/1990 | Mercer et al. | |
| 6,950,984 B2* | 9/2005 | Hori et al. | 715/229 |
| 7,240,119 B2 | 7/2007 | Ascoli et al. | |
| 7,596,523 B2* | 9/2009 | Sobel et al. | 709/202 |
| 2003/0018646 A1* | 1/2003 | Ohta et al. | 707/100 |
| 2003/0149608 A1* | 8/2003 | Kall et al. | 705/8 |
| 2004/0210500 A1* | 10/2004 | Sobel et al. | 705/35 |
| 2005/0075544 A1 | 4/2005 | Shapiro et al. | |

* cited by examiner

*Primary Examiner* — Ajay Bhatia
(74) *Attorney, Agent, or Firm* — Mark A. Conklin, Esq.; Armstrong Teasdale LLP

(57) ABSTRACT

A method for configuring a programmable logic controller (PLC) having a protocol is provided. The method includes providing an extensible markup language (XML) schema for the protocol of the PLC. In another aspect, a method for configuring a programmable logic controller (PLC) having a protocol includes utilizing the schema to validate at least one XML file parsed from a comma separated variable (CSV) file created by a configuration tool for a protocol different than the protocol of the PLC. In another aspect, a method for configuring a programmable logic controller (PLC) having a protocol includes utilizing the schema to validate at least one XML file parsed from a comma separated variable (CSV) file created by a configuration tool.

17 Claims, 3 Drawing Sheets

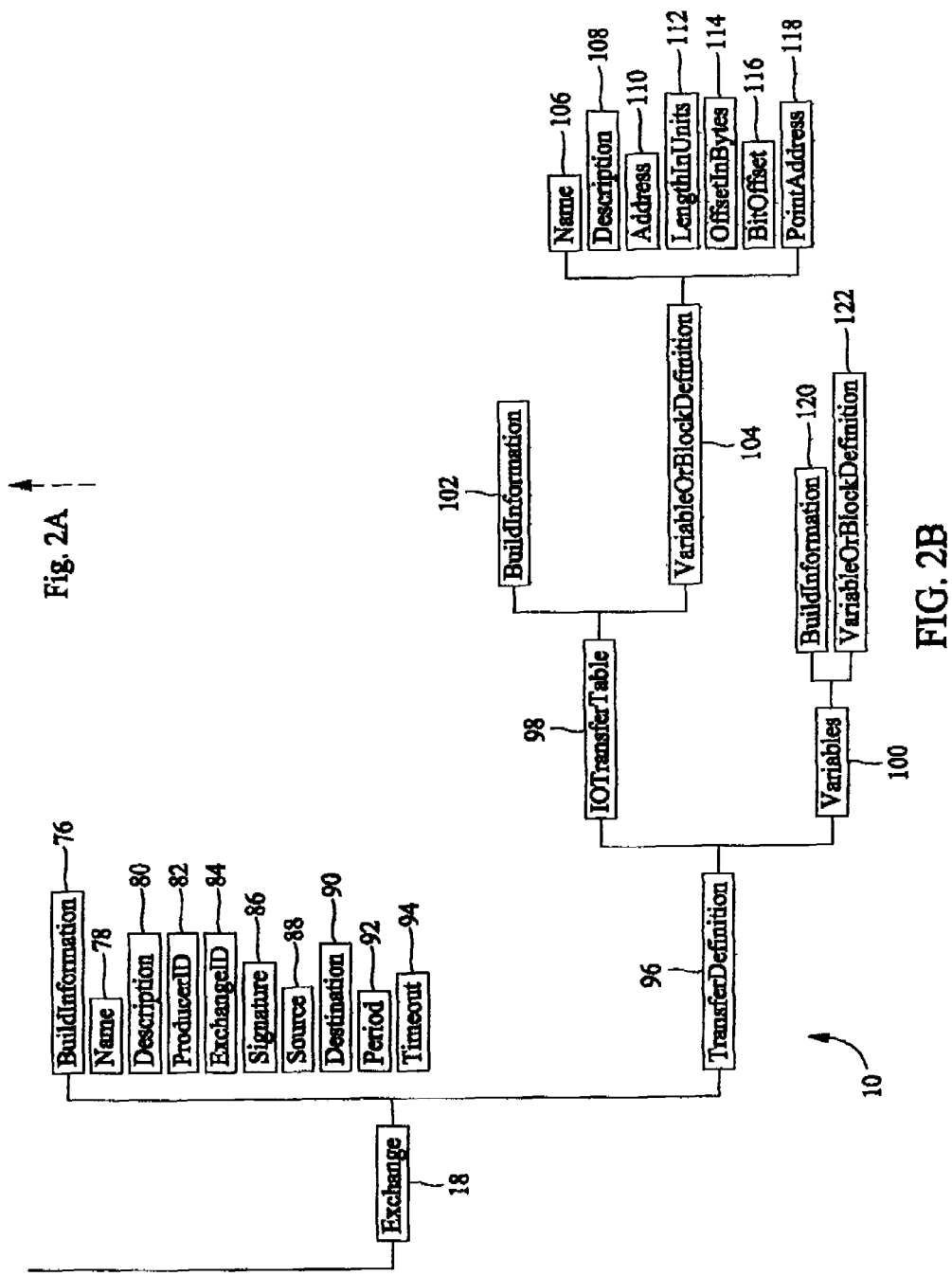

METHOD FOR CONFIGURING A PROGRAMMABLE LOGIC CONTROLLER USING A SCHEMA TO VALIDATE EXTENSIBLE MARKUP LANGUAGE FILE

CROSS REFERENCE TO RELATED APPLICATIONS

This is a continuation application of U.S. patent application Ser. No. 10/065,623, filed Nov. 4, 2002 now U.S. Pat. No. 7,240,119, which is hereby incorporated by reference in its entirety.

BACKGROUND OF THE INVENTION

This invention relates generally to networked devices and, more particularly, to communications between Ethernet Transmission Control Protocol/Internet Protocol (TCP/IP) networked devices.

On an Ethernet TCP/IP network, the delivery time for a packet of data depends on the amount of traffic on the network. One known method for increasing efficiency and speed on an Ethernet network is to allow one device (a producer) to transfer data to a plurality of other devices (consumers) using a Global Data (GD) protocol as taught in U.S. Pat. No. 4,926,375, assigned to GE Fanuc Automation North America, Inc., Charlottesville, Va. An Ethernet Global Data (EGD) protocol enables a plurality of consuming devices and producing devices to operate asynchronously of each other. These devices include programmable logic controllers (PLCs) and computers, and the data transfers therebetween are commonly called exchanges.

Typically, users of EGD define a comma separated variable (CSV) file format for importing and exporting exchanges for the user's devices. However, the user defined CSV files do not address the configuration of devices of other users, and are not platform and programming language independent.

However, devices supporting the EGD Protocol use a different mechanism for defining and specifying content.

BRIEF SUMMARY OF THE INVENTION

The present invention is, in one aspect, a method for configuring a programmable logic controller (PLC) having a protocol. The method includes the step of providing an extensible markup language (XML) schema for the protocol of the PLC.

In another aspect, a method for configuring a programmable logic controller (PLC) having a protocol is provided. The method includes utilizing the schema to validate at least one XML file parsed from a comma separated variable (CSV) file created by a configuration tool for a protocol different than the protocol of the PLC.

In another aspect, a method for configuring a programmable logic controller (PLC) having a protocol is provided. The method includes utilizing the schema to validate at least one XML file parsed from a comma separated variable (CSV) file created by a configuration tool.

BRIEF DESCRIPTION OF THE DRAWINGS

FIGS. 2A and 2B show one embodiment of a file structure of an extensible mark up language schema system.

DETAILED DESCRIPTION OF THE INVENTION

There is herein provided a standard mechanism for defining and specifying content for Ethernet Global Data (EGD) which is programming language and platform independent. Also provided herein is a definition of EGD using XML, a standard format for defining EGD that is both programming language and platform independent and a mechanism for configuring EGD devices.

The present invention provides a standard mechanism for defining and specifying content for Ethernet Global Data (EGD) which is programming language and platform independent.

The present invention also provides EGDML which is a markup language based on Extensible Markup Language (XML). EGDML provides a standard means for describing Ethernet Global Data definitions and content. By basing EGDML on XML the exchange is programming language, and platform independent.

The EGDML based approach provides a single format that is applicable to all devices. XML parsers are freely available and therefore there is little or no work on clients to support the file format.

Figure 1:
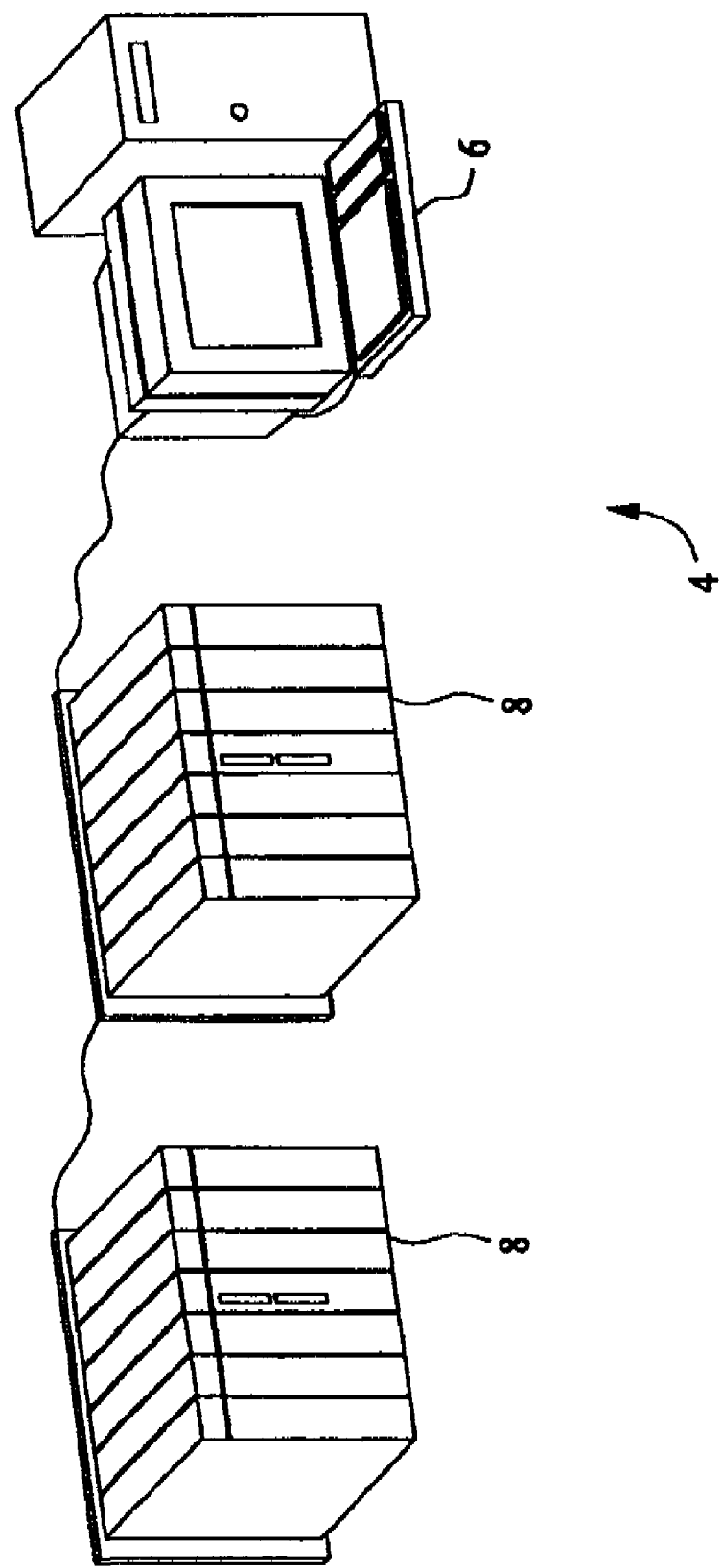
FIG. 1 is one embodiment of an extensible mark up language schema system.

FIG. 1 is one embodiment of an extensible mark up language (XML) schema system 4 including a computer 6 and at least one programmable logic controller (PLC) 8. In one embodiment, PLCs 8 are series 90-30 controllers commercially available from the GE Fanuc Automation Corporation, Charlottesville, Va. Computer 6 is networked to PLCs 8 utilizing an Ethernet Global Data (EGD) protocol. It should be understood that the present invention can be practiced with many alternative computers, and is not limited to practice in connection with just computer 6. Therefore, and as used herein, the term computer is not limited to just those integrated circuits referred to in the art as computers, but broadly refers to computers, processors, microcontrollers, microcomputers, application specific integrated circuits, Field Programming Gate Arrays (FPGA), Programmable Logic Controllers (PLC) and other programmable circuits.

In one embodiment, PLCs 8 are accessible to computer 6 via a network such as an Intranet or the Internet. In another embodiment, PLCs 8 and computer 6 are interconnected to a network, such as a local area network (LAN) or a wide area network (WAN), through many interfaces including cable modems, high-speed Integrated Services Digital Network (ISDN) lines, and telephone connections including telephone modems and DSL connections (Digital Subscriber Line). As explained below in greater detail, computer 6 utilizes an EGDML to configure PLCs 8.

Figure 2A:
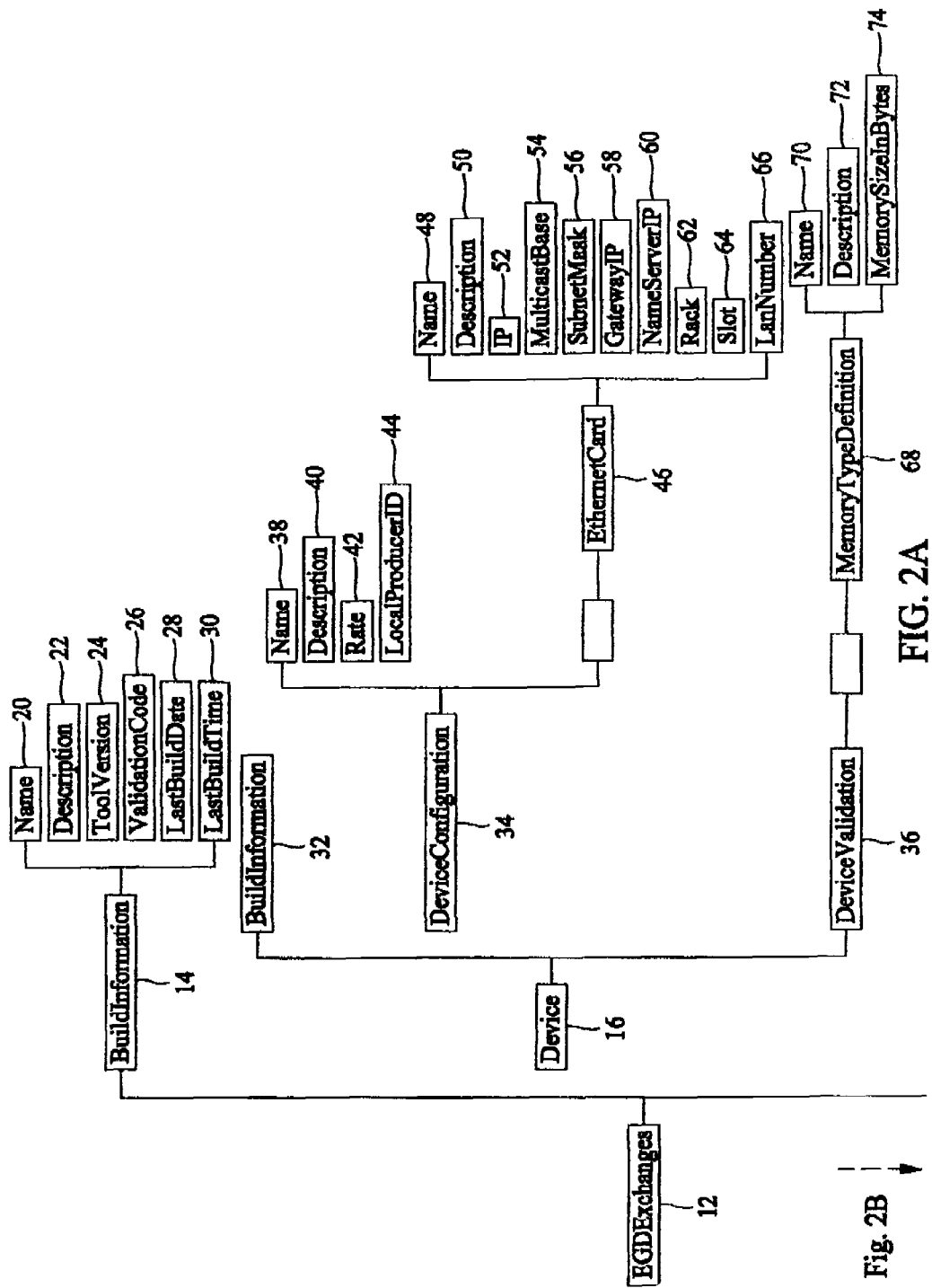

FIGS. 2A and 2B illustrate a file structure of an extensible mark up language (XML) schema file 10 that is utilized to facilitate configuring multiple devices including PLCs by providing a standard format for defining a protocol for the device. The standard format is programming language and platform independent. In one embodiment, the device is a PLC and the protocol is Ethernet Global Data.

File 10 includes an Exchange element 12. In one embodiment, Exchange element 12 is an EGD Exchange element. Exchange element 12 includes a Build Information element 14, a Device element 16, and an Exchange element 18. Elements of Build Information element 14 include a Name element 20, a Description element 22, a Tool Version element 24, a Validation Code element 26, a Last Build Date element 28, and a Last Build Time element 30. Build Information element 14 includes items that are read and written by a configuration tool. Accordingly, Build Information element 14 further includes a flag defined Editable, which is set to ToolOnlyEditable such that a user opening file 10 is informed that Build Information element 14 is not user editable.

XML definition file 10 is utilized to access an XML data file written by a conventional configuration tool. More specifically, Name 20 is utilized to reference the name of the configuration tool that wrote the file. Description 22 is used to reference a description of the configuration tool that wrote the file. Tool Version 24 is utilized to reference the version of the configuration tool that wrote the file. Validation Code 26 is used to reference a number field that is used by the tool for comparing whether the file has changed. In an alternative embodiment, Validation Code is utilized to reference a checksum. Last Build Date 28 is used to reference the date the file was last built by the configuration tool. Last Build Time 30 is used to reference the time the file was last built by the configuration tool.

Device element 16 includes a Build Information element 32, a Device Configuration element 34, and a Device Validation element 36. Build Information element 32 includes elements identical to the elements described above included in Build Information 14. Device Configuration element 34 includes a Name element 38, a Description element 40, a Rate element 42, a Local Producer ID element 44, and an Ethernet Card element 46. Name 38 is used to reference the name of a device. Description 40 is utilized to reference a description for the named device. Rate 42 is used to reference a scan rate for the device. Local Producer ID 44 is utilized to reference a Producer ID for the device. Ethernet Card 46 is used to reference a definition of an Ethernet card associated with the device. In one embodiment, Ethernet card 46 is utilized to reference a plurality of Ethernet cards associated with the device.

Ethernet card element 46 includes a Name element 48, a Description element 50, an IP element 52, a Multicast Base element 54, and a Subnet Mask element 56. Further elements of Ethernet card 46 include a Gateway IP element 58, a Name Server IP element 60, a Rack element 62, a Slot element 64, and a Lan Number element 66. Name 48 is utilized to reference a name associated with an Ethernet card. Description 50 is used to reference a description for the card. IP 52 is utilized to reference an IP address associated with the card. Multicast Base 54 is used to reference a multicast base address associated with the card. Subnet Mask 56 is used to reference a subnet mask associated with the card. Gateway IP 58 is utilized to reference a gateway IP address. Name Server IP 60 is used to reference a nameserver IP address. Rack 62 is utilized to reference a rack number associated with a rack that the card is mounted in. Slot 64 is used to reference a slot number that the card is in on the rack. Lan Number 66 is utilized to reference a network number associated with the Ethernet card.

Device Validation element 36 includes a Memory Type Definition element 68 utilized to reference data relating to a memory. Memory Type Definition element 68 includes a Name element 70, a Description element 72, and a Memory Size In Bytes element 74. Name 70 is utilized to reference a name of the memory. Description 72 is used to reference a description of the memory. Memory Size In Bytes 74 is used to reference the size of the memory in bytes.

Exchange element 18 includes a Build Information element 76, a Name element 78, Description element 80, a Producer ID element 82 and an Exchange ID element 84. Further elements of Exchange 18 include a Signature element 86, a Source element 88, a Destination element 90, a Mode element (not shown), a Period element 92, a Timeout element 94, a Transfer Definition element 96, and a Send Type element (not shown). Build Information element 76 includes elements identical to the elements described above included in Build Information 14 and Build Information 32. Name 78 is used to reference a name of an exchange. Description 80 is used to reference a description of the exchange. Producer ID 82 is used to reference an exchange producer identifier (ID). Exchange ID 84 is used to reference an exchange ID. Signature 86 is used to reference a configuration signature value for the exchange (zero or non-zero). The applicability of signature 86 is determined external of the file. Source 88 is used to reference a source for the exchange. Destination 90 is utilized to reference a destination IP address for the exchange. Destination 90 includes an attribute that describes whether the destination is unicast, multicast, or broadcast. Mode is used to reference that the only valid values are Producer or Consumer describing mode of the exchange. Period 92 is used to reference the production or the consumption period for the exchange based upon the mode. Timeout 94 is used only for consumed exchanges and references how often the occurrence of a refresh error should be declared. Transfer Definition 96 is utilized to reference a table that defines what pieces of the device's memory and variables are used in this exchange. Send Type is utilized to reference descriptions of conditions under which data will be produced.

Transfer Definition element 96 includes an input/output (IO) Transfer Table element 98 and a Variables element 100. IO Transfer Table element 98 includes a Build Information element 102 and a Variable Or Block Definition element 104. Build Information element 102 includes elements identical to the elements described above included in Build Informations 14, 32, and 76. Variable Or Block Definition element 104 includes a Name element 106, a Description element 108, an Address element 110, a Length In Units element 112, a Data Type element (not shown), an Offset In Bytes element 114, a Bit Offset element 116, and a Point Address element 118. Name 106 is used to reference a name of a variable or a device memory reference. Description 108 is used to reference a description of the variable or device memory. Address 110 is used to reference a device starting address for where the variable/memory is located in the device. Length In Units 112 is used to reference a length for the memory in the device from the address referenced by Address 110. The DataType is used to reference a data type of the variable. Offset In Bytes 114 is used to reference an offset in bytes of where this data is located in the exchange. Bit Offset 116 is used to reference a bit offset within an exchange byte. Point Address 118 is used to reference a point address format of the variable as used by a Human Machine Interface (HMI). This is provided for interoperability with current EGD implementations.

Variables element 100 includes a Build Information element 120 and a Variable Or Block Definition element 122. Build Information element 120 includes elements identical to the elements described above included in Build Information 14, 32, 76, and 102. Accordingly, the multiple occurrences of Build Information elements allows a configuration tool to determine which parts of a file have been modified since the file was last created.

To configure PLC 8 (shown in FIG. 1), a user utilizes a conventional configuration tool to enter a plurality of configuration parameters. The configuration tool outputs the parameters to form an XML file. In one embodiment, the XML file is in a format with grammar according to the schema illustrated in FIG. 2. In an alternative embodiment, the configuration tool outputs the parameters to form an XML file in an alternative format. However, since XML parsers are readily available, a user parses the alternative format to create an XML file with grammar according to the schema illustrated in FIG. 2. More particularly, the file in an alternate format is first transformed using XSL (eXtensible Stylesheet Language) and then parsed. In alternative embodiments, XML schemas other than the schema illustrated in FIG. 2 are utilized. In any case though, since XML parsers are readily available for many different Platforms, the methods described herein are employable with many different EGD implementations.

While the invention has been described in terms of various specific embodiments, those skilled in the art will recognize that the invention can be practiced with modification within the spirit and scope of the claims.

The invention claimed is:

1. A method for configuring a programmable logic controller (PLC) having a first protocol, said method comprising:
   creating a comma separated variable (CSV) file at a computer using a configuration tool having a second protocol different from the first protocol;
   parsing the CSV file at the computer to create at least one extensible markup language (XML) file;
   utilizing a schema to validate the at least one XML file at the computer, the schema including an Exchange element including at least one of:
      an Exchange ID element configured to reference an identifier of the exchange;
      a Signature element configured to reference a configuration signature value for the exchange;
      a Timeout element configured to reference a frequency a refresh error is to be declared; and
      a Build Information element including at least one of:
         a Name element configured to identify the configuration tool;
         a Description element configured to provide a description of the configuration tool;
         a Tool Version element configured to specify a version of the configuration tool;
         a Validation Code element configured to identify a field used by the configuration tool to determine whether the CSV file has been modified;
         a Last Build Date element configured to a last date the CSV file was created by the configuration tool; and
         a Last Build time element configured to specify a last time the CSV file was created configuration tool; and
   configuring the PLC using the XML file.

2. A method in accordance with claim 1 wherein utilizing a schema to validate at least one XML file further comprise using grammar at least partially according to the schema.

3. A method in accordance with claim 1 further comprising transforming the at least one XML file using extensible style sheet language and then parsing the at least one XML file.

4. A method in accordance with claim 1 wherein utilizing a schema to validate at least one XML file further comprises facilitating configuring multiple devices by providing a standard format for defining a protocol for a device.

5. A method in accordance with claim 1 wherein utilizing a schema to validate at least one XML file further comprises using an XML schema including at least one of a plurality of elements to determine at least one configuration parameter within the at least one XML file.

6. A method in accordance with claim 1 wherein utilizing a schema to validate at least one XML file further comprises using a schema including a Device element including at least one of:
   a Device Configuration element configured to specify at least one of a name of a device, a description of the device, and a scan rate for the device by the programmable logic controller; and
   a Device Validation element configured to reference date relating to a memory.

7. A method in accordance with claim 1 wherein utilizing a schema to validate at least one XML file further comprises using a schema including the Exchange element including at least one of:
   a Name element configured to reference a name of an exchange;
   a Description element configured to reference a description of the exchange;
   a Producer Identifier element configured to reference an exchange producer identifier;
   a Source element configured to reference a source for the exchange;
   a Destination element configured to reference a destination address for the exchange; and
   a Period element configured to reference one of a production period and a consumption period for the exchange based on an exchange mode.

8. A method for configuring a programmable logic controller having a protocol, said method comprising:
   creating a comma separated variable (CSV) file at a computer using a configuration tool;
   parsing the CSV file to create at least one extensible markup language (XML) file at the computer;
   utilizing a schema to validate the at least one XML file at the computer the schema including an Exchange element including at least one of:
      an Exchange ID element configured to reference an identifier of the exchange;
      a Signature element configured to reference a configuration signature value for the exchange;
      a Timeout element configured to reference a frequency a error is to be declared; and
      a Build Information element including at least one of:
         a Name element configured to identify the configuration tool;
         a Description element configured to provide a description of the configuration tool;
         a Tool Version element configured to specify a version of the configuration tool;
         a Validation Code element configured to identify a field used by the configuration tool to determine whether the CSV file has been modified;
         a Last Build Date element configured to specify a last date the CSV file was created by the configuration tool; and
         a Last Build time element configured to specify a last time the CSV file was created by the configuration tool; and
   configuring the PLC using the XML file.

9. A method in accordance with claim 8 wherein utilizing a schema to validate at least one XML file further comprises using grammar at least partially according to the schema.

10. A method in accordance with claim 8 further comprising transforming the at least one XML, file using extensible style sheet language.

11. A method in accordance with claim 8 wherein utilizing a schema to validate at least one XML file further comprises using a schema including at least one of a plurality of elements to determine at least one configuration parameter within the at least one XML file.

12. A method in accordance with claim 8 wherein utilizing a schema to validate at least one XML, file further comprises using a schema including a Device element including at least one of:

a Device Configuration element configured to specify at least one of a name of a device, a description of the device, and a scan rate for the device by the programmable logic controller; and a Device Validation element configured to reference date relating to a memory.

13. A method in accordance with claim 12 wherein utilizing a schema to validate at least one XML file further comprises using a schema including the Device element and the Exchange element, the Exchange element including at least one of:

a Name element configured to reference a name of an exchange;

a Description element configured to reference a description of the exchange;

a Producer Identifier element configured to reference an exchange producer identifier;

a Source element configured to reference a source for the exchange;

a Destination element configured to reference a destination address for the exchange; and a Period element configured to reference one of a production period and a consumption period for the exchange based on an exchange mode.

14. A method in accordance with claim 8 wherein utilizing a schema to validate at least one XML file further comprises using a schema including the Exchange element including at least one of:

a Name element configured to reference a name of an exchange;

a Description element configured to reference a description of the exchange;

a Producer Identifier element configured to reference an exchange producer identifier;

a Source element configured to reference a source for the exchange;

a Destination element configured to reference a destination address for the exchange; and a Period element configured to reference one of a production period and a consumption period for the exchange based on an exchange mode.

15. A method for configuring a programmable logic controller (PLC) having a first protocol, said method comprising:

creating a comma separated variable (CSV) file at the computer using a configuration tool having a second protocol different from the first protocol;

parsing the CSV file to create at least one extensible markup language (XML) file at the computer;

utilizing a schema to validate the at least one XML file at the computer using grammar at least partially according to the schema, the schema including an Exchange element including at least one of:

an Exchange ID element configured to reference an identifier of the exchange;

a Signature element configured to reference a configuration signature value for the exchange a Timeout element configured to reference a frequency a refresh error is to be declared; and a Build Information element including at least one of:

a Name element configured to identify the configuration tool;

a Description element configured to provide a description of the configuration tool;

a Tool Version element configured to specify a version of the configuration tool;

a Validation Code element configured to identify a field used by the configuration tool to determine whether the CSV file has been modified:

a Last Build Date element configured to specify a last date the CSV file was created by the configuration tool; and a Last Build time element configured to specify a last time the CSV file was created by the configuration tool; and configuring the PLC using the XML file.

16. A method in accordance with claim 15 further comprising transforming the at least one XML file using extensible style sheet language and then parsing the at least one XML file.

17. A method in accordance with claim 15 wherein utilizing a schema further comprises using an XML schema including at least one of a plurality of elements to determine at least one configuration parameter within the at least one XML file.

* * * * *